United States Patent [19]
Baldock

[11] Patent Number: 5,915,980
[45] Date of Patent: Jun. 29, 1999

[54] WIRING INTERCONNECTION SYSTEM

[75] Inventor: George M. Baldock, 4170 N. Marine Dr., #11B, Chicago, Ill. 60613

[73] Assignee: George M. Baldock, Chicago, Ill.

[21] Appl. No.: 08/940,137

[22] Filed: Sep. 29, 1997

[51] Int. Cl.⁶ ................................................. H01R 13/60
[52] U.S. Cl. .......................................... 439/120; 439/426
[58] Field of Search .............................. 439/94, 110, 121, 439/135, 207, 892, 893, 116, 120, 111, 109, 391, 374, 378, 425, 426

[56] References Cited

U.S. PATENT DOCUMENTS

| | | | |
|---|---|---|---|
| 3,141,718 | 7/1964 | Schott et al. | 339/103 |
| 3,789,344 | 1/1974 | Brorein et al. | 339/59 M |
| 4,091,233 | 5/1978 | Berman | 339/178 |
| 4,454,374 | 6/1984 | Pollack | 174/68 R |
| 4,563,542 | 1/1986 | Pollack | 174/68 |
| 4,566,749 | 1/1986 | Johnston | 339/25 |
| 4,613,197 | 9/1986 | Munroe et al. | 339/99 |
| 4,726,784 | 2/1988 | Appleton | 439/409 |
| 4,971,564 | 11/1990 | Meyer | 439/70 |
| 5,061,209 | 10/1991 | Bolick, Jr. et al. | 439/676 |
| 5,085,594 | 2/1992 | Kaelin | 439/427 |
| 5,148,490 | 9/1992 | Draffen | 381/86 |
| 5,336,849 | 8/1994 | Whitney | 174/48 |
| 5,367,122 | 11/1994 | de Olano | 174/48 |
| 5,376,758 | 12/1994 | Kimber | 174/128.1 |
| 5,402,322 | 3/1995 | Kunkler et al. | 361/809 |
| 5,403,201 | 4/1995 | McCarthy | 439/427 |
| 5,594,203 | 1/1997 | Veermeer | 174/48 |

*Primary Examiner*—Gary Paumen
*Assistant Examiner*—Alexander Gilman
*Attorney, Agent, or Firm*—Welsh & Katz, Ltd.

[57] ABSTRACT

A wiring interconnection assembly for interconnecting a plurality of electrical components includes an insulated cable carrier having a body portion, at least one conducting element integrally formed within the body portion, and a connecting module removeably coupled to the cable carrier configured to facilitate connection of each end of the cable carrier to tone of the plurality of electrical components. The connecting module has at least one penetrating member configured to penetrate a portion of the body portion of the cable carrier and contact the conducting element to establish electrical continuity therewith.

17 Claims, 7 Drawing Sheets

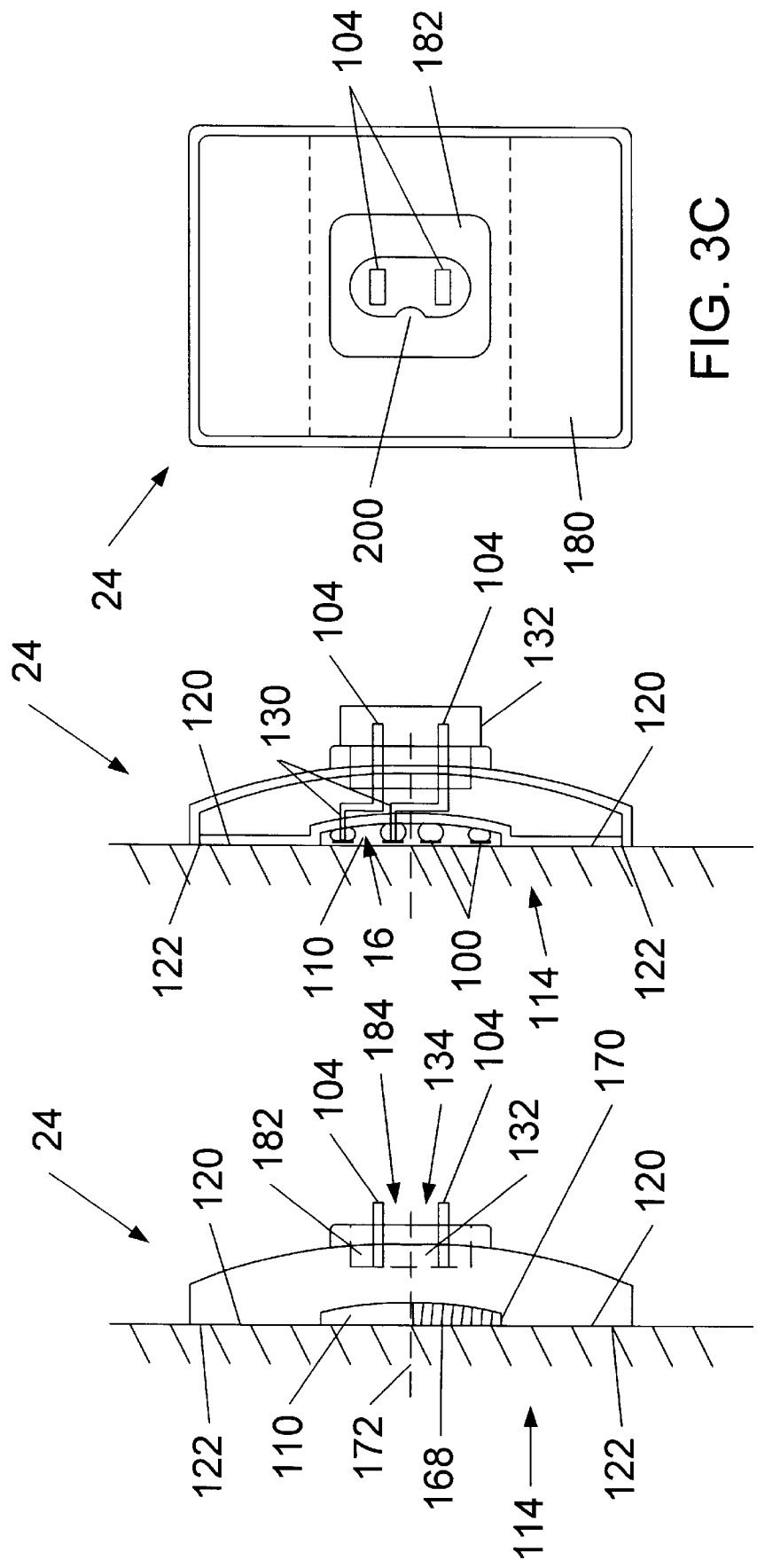

WIRING INTERCONNECTION SYSTEM

BACKGROUND OF THE INVENTION

The present invention relates generally to a wiring interconnection scheme and more specifically to a wiring assembly for organizing and arranging wiring between electrical components, such as between loud speakers and stereo equipment.

When connecting loud speakers to stereo components, long lengths of speaker wire are typically routed along the floor between the speakers and the stereo component. To permit future relocation of the speakers, users often use a longer length of wire than is necessary, and typically ties the excess wire in a bunch. Two to four speakers may be connected, and sophisticated home theater arrangements may include many additional speakers. Such a plethora of cables creates an unsightly and disorganized. "rat's nest" of cables, which detracts from the overall aesthetic appearance of the room.

U.S. Pat. Nos. 4,454,374 and 4,563,542 issued to Pollack disclose an electric cord holder comprising a U-shaped shell with a hinged or slotted covering. The cord holder is in the form of a partially open conduit having a longitudinal slot, and is configured to be secured to a wall by a chemical adhesive. An electrical cord from an appliance is inserted into the cord holder, and the cord holder is secured to the wall to protect the loose cord. However, the cord holder is not suitably arranged to interconnect multiple components, and is not adapted so that the wiring may be extended, as is required when connecting loud speakers to a receiver or amplifier.

Users wishing to hide the speaker cables have few choices. One solution is to "hide" the cables within the walls. However, this is expensive and is only suitable for permanent component placement. Another choice is to "wrap" the cables in a form of tubing or conduit described above. However, moving the components to other locations requires installation or removal of sections of the conduit. Additionally, the conduit is relatively bulky in appearance and is very noticeable, as it significantly protrudes from the wall.

Accordingly, it is an object of the present invention to provide a novel wiring assembly to substantially overcome the above-described problems.

It is another object of the present invention to provide a novel wiring assembly to organize the interconnection wires between electrical components.

It is a further object of the present invention to provide a novel wiring assembly to interconnect loud speakers placed at various distances within an area while avoiding unsightly and disorganized loose wires.

SUMMARY

The disadvantages of present wiring organizing techniques are substantially overcome with the present invention by providing a novel wiring interconnection system for organizing and arranging wiring between electrical components.

The present invention provides a convenient and aesthetically pleasing system for interconnecting loud speakers to electronic components in a neat and orderly manner. Unsightly and potentially dangerous bundles of wires that are often strewn on the floor haphazardly are conveniently organized and routed along the wall at any desired location. The cable that interconnects the components has a protective adhesive backing so that the cable may be quickly affixed to the wall using hand pressure. Cable guides route the cable around doors and corners without requiring splicing. A connecting module fits over the cable and provides electrical continuity between the cable and a modular plug that attaches to the connecting module. All cables are routed quickly and easily in an aesthetically pleasing manner.

More specifically, the wiring interconnection assembly for interconnecting a plurality of electrical components includes an insulated cable carrier having a body portion, at least one conducting element integrally formed within the body portion, and a connecting module removeably coupled to the cable carrier configured to facilitate connection of each end of the cable carrier to the electrical components. The connecting module has at least one penetrating member configured to penetrate a portion of the body portion of the cable carrier and contact the conducting element to establish electrical continuity.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings.

FIG. 3A is an end elevational view of a specific embodiment of a connecting module, according to the present invention;

FIG. 3B is an end sectional vie of the connecting module of FIG. 3A;

FIG. 3C is a side plan sectional view of the connecting module of FIG. 3A;

DETAILED DESCRIPTION

Figure 1:
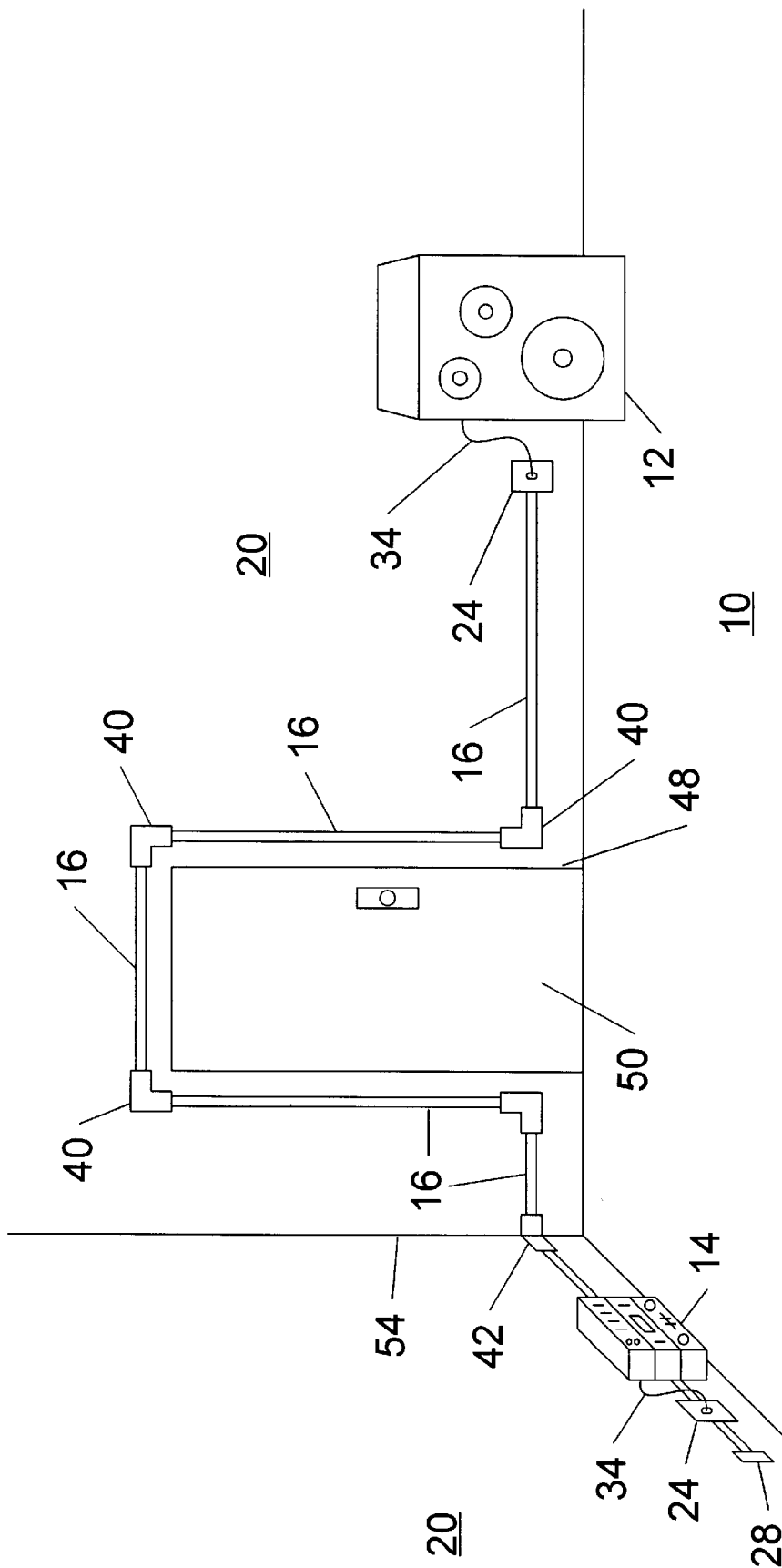
FIG. 1 is a perspective view of a specific embodiment of a wiring interconnection system, according to the present invention.

Referring now to FIG. 1, a wiring interconnection system 10 is shown generally. Typically, the system 10 is used to connect loud speakers 12 to an electronic component 14, such as an amplifier, receiver, tuner, or the like. Each loud speaker 12 is connected to the electronic component 14 by a length of self-adhering insulated cable or a cable carrier 16. The cable carrier 16 is affixed to a wall 20 or baseboard and extends between the loud speaker 12 and the electronic component 14. Although only a single cable carrier 16 is shown in FIG. 1, which connects the loud speaker 12 to the electronic component 14, two cable carriers may be mounted to the wall 20 in an adjacent side-by-side manner. Such a configuration would be used, for example, if both loud speakers 12 were located next to each other and away from the electronic component 14. Preferably, the system 10 is used to interconnect low-voltage components. However, the system 10 can be used to interconnect high-voltage components with suitable modification to the current carrying capability of the cable carrier 16 and parts attached thereto.

A connecting module 24 is coupled to opposite ends of the cable carrier 16 and is configured to facilitate connection of each end of the cable carrier to the electrical component 14. Of course, the connecting module 24 may also engage the cable carrier 16 at any point along the length of the cable carrier to establish multiple parallel connections, as may be desired if the cable carrier is used to connect computer equipment and the like. Alternatively, if the end of the cable carrier 16 extends past the end of the connecting module 24, a "dummy" end cap 28 may be mounted to the end of the cable carrier for aesthetic reasons. The connecting module 24 is configured to fit over an individual cable carrier 16 or over a group of two (or more) adjacent cable carriers. The connecting module 24 is self-adhering and self-aligning over one or both cable carriers 16. One connecting module 24 is placed over the cable carrier 16 at a point proximal the loud speaker 12, and another connecting module is placed over the cable carrier at a point proximal the electronic component 14. The connecting module 24 is connected via a length of coiled wire 34, such as "telephone" type coiled wire, to the loud speaker or electronic component 12 or 14, respectively.

To navigate corners without revealing an unsightly bend in the cable carrier 16, two types of corner connectors 40 and 42 are provided. A planar corner guide 40 is provided that is configured to route the cable carrier 16 along the wall 20, such as around corners 48 of a door 50. A hinge-type corner guide 42 is provided that is configured to route the cable carrier 16 around an inside corner 54 formed by two walls, and resembles a hinge having right-angle portions. The guides 40 and 42 will be described in greater detail hereinafter.

Thus, is can be seen that one cable carrier 16 in conjunction with two connecting modules 24 and two relatively short lengths of coiled wire 34 permit one loud speaker 12 to be neatly and concisely connected to the electronic component 14. Each loud speaker 12 is connected using one length of cable carrier 16, two connector modules 24, and two lengths of coiled wire 34. As described above, in a typical installation, the electronic component 14 is disposed in between two loud speakers 12. Therefore, each cable carrier 16, with its attendant connecting modules 24, extend in opposite directions beginning at the location of the electronic component 14, and extending toward the loudspeaker 12. However, in some installations, both loud speakers 12 may be located on one side of the electronic component 14. In this case, a second cable carrier 16 (not shown) is mounted adjacent the first cable carrier and similarly includes its attendant connecting modules 24, as will be described in greater detail hereinafter.

The cable carrier 16 and the connecting modules 24 have relatively low profiles, thus appear somewhat flat and do not significantly extend from the flat wall surface 20 to which they are affixed. This eliminates the cluttered appearance of multiple lengths of cable placed haphazardly on the floor, and provides an organized and aesthetically pleasing system for interconnecting the loud speakers 12 to the electronic component 14. Additionally, user safety is increased because all cables are placed away from the floor where individuals could accidentally become entangled and trip, possibly resulting in injury. Of course, the present invention 10 is not limited to connecting loud speakers 12 to stereo components 14, and may be used to interconnect any electronic component to any other electronic component, such as telephone type devices, which require a cable having at least four conductors. Further, the cable carrier 16 is not limited to a specific number of conducting elements, as will be described hereinafter. Any suitable number of conducting elements may be included, such as in a system used to interconnect computer components.

Figure 2B:
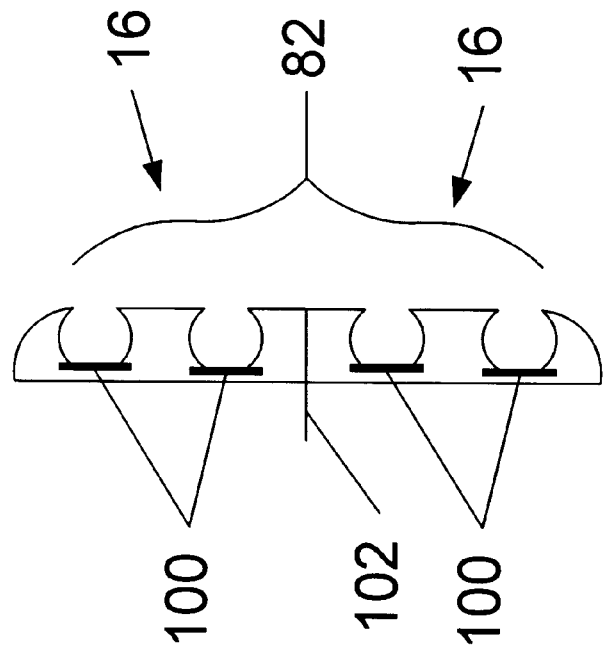
FIGS. 2A and 2B are side elevational views of a specific embodiment of a cable carrier, according to the present invention.
Figure 2A:
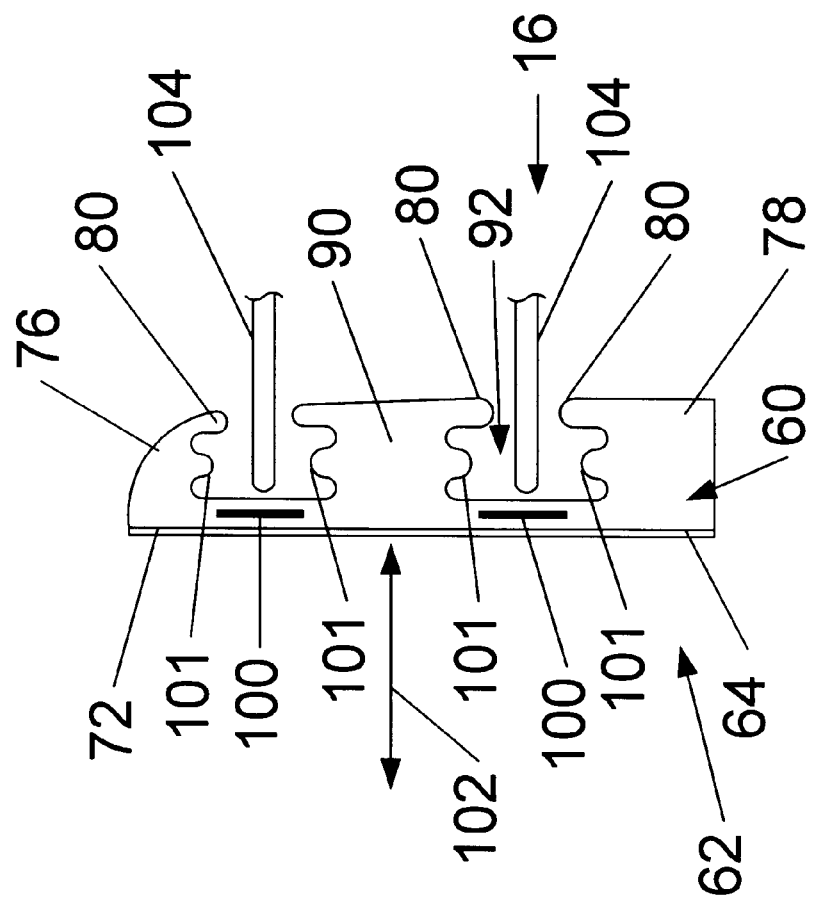

Referring now to FIGS 1, and 2A–2B, the cable carrier 16 is shown generally in FIGS. 2A–2B. FIG. 2A shows a single cable carrier 16 while FIG. 2B shows two adjacent cable carriers arranged in a side-by-side configuration with corresponding edges abutting each other. The cable carrier 16 includes a body portion 60 formed of a flexible insulating material. The cable carrier 16 may be formed by conventional molding techniques, such as extrusion techniques and the like, and may be formed of flexible plastic or rubber, such as PVC or any suitable insulating material. The cable carrier 16 is generally rectangular in cross-sectional shape and presents a relatively low profile when affixed to the wall 20. For example, the cable carrier 16 may be one-half inch wide by one-eighth inch thick. However, the cable carrier 16 may be formed in any suitable size depending upon the application. The cable carrier 16 includes at least one substantially flat bottom portion 62, and has an adhesive material, such as double-stick tape, or adhesive foam 64, affixed to an external surface portion thereof. This facilitates adhesively securing the cable carrier 16 to the surface of the wall 20 in a quick and easy manner. The adhesive material 64 has a protective backing 72 that may be removed by peeling off the backing to expose the adhesive. Once the protective backing 72 is removed, the cable carrier 16 is affixed to the wall 20 or base board using finger pressure.

Although the cable carrier 16 is generally rectangular in shape, it is preferably not fully closed or solid when viewed along its cross-section. A first side wall 76 and a second side wall 78 are included, each of which includes an inwardly directed extension portion 80 that forms a covering or top portion 82 (FIG. 2B). As can be seen in FIG. 2A, the cable carrier 16 is "E-shaped," where the first side wall 76, the second side wall 78, and a middle wall 90 form the right side of an "E-shaped" structure. The first side wall 76, the second side wall 78, and the middle wall 90 are integrally formed with the bottom portion 62, and essentially cover the bottom portion of the cable carrier 16, and also provide access to an internal portion 92 of the bottom portion 62.

The cable carrier 16 includes two conducting elements 100 that may be integrally formed with and embedded within the bottom portion 62 of the body portion 16, interchangeably referred to as "conducting elements," or "braided conductors," or "braided wires." The conducting elements 100 provide a signal and return path for applications involving connection between the loud speakers 12 and the receiver or amplifier 14, or any other "single-ended" electrical application. However, any suitable number of conducting elements 100 may be embedded within the body portion 60 in a side-by-side arrangement depending upon the specific application. The conducting elements 100 are arranged in a spaced apart orientation equidistant from a center line 102 of the cable carrier 16. This facilitates coupling the cable carrier 16 to the connecting module 24 regardless of whether the connecting module is oriented at zero degrees or one-hundred and eighty degrees relative to the cable carrier.

However, the conducting elements 100 need not necessarily be integrally formed with and embedded within the material forming the body portion 60. Rather, the conducting element 100 may lie flat against the internal portion 92 of the body portion 60. To retain the conducting element 100 against the internal portion 92, ridges or tabs 101 located on the first side wall 76, the second side wall 78, and the middle wall 90, extend laterally to essentially "trap" the conducting element 100 against the internal portion 92.

Each conducting element 100 is formed of braided wire rather than solid wire or non-braided stranded wire. The braided wire 100 is configured to partially resist separation of strands caused by penetration through the braided wire by a penetrating member or prong 104 (FIG. 2B) of the connecting module 24, as will be described in greater detail hereinafter. The penetrating member 104 is configured to pierce the body portion 60 and contact the braided wire 100. Because the body portion 60 is not completely solid, the penetrating member 104 easily passes between the extension portions 80 of the middle wall 90 and side walls 76 and 78, respectively. Accordingly, the penetrating member 104 need only penetrate the exposed conducting element 100 or, alternatively, need only penetrate the relatively thin bottom portion 62 of the body portion 60. Once penetrated, the braided strands 100 resist separation, and thus form an interference fit with the penetrating member 104 so as to establish and maintain electrical continuity between the braided wire 100 and the penetrating member. Use of foil-type conductors or non-braided wire is not desirable because electrical continuity cannot be reliably maintained over time. Small vibrations and movement of the cable carrier 16 cause the penetrating member 104 to separate from a foil-type conductor or non-braided stranded conductor. However, the tight "weave" of the braided strands 100 causes the penetrating member 104 to maintain contact with the braided conductor so that the cable carrier 16 may be physically positioned and repositioned without loss of electrical continuity. Preferably, the braided wire 100 is formed of multiple strands of copper wire.

Referring now to FIGS. 3A–3C, the connecting module 24 is shown generally. As shown in FIG. 3A, the connecting module 24 includes a cable receiving recess 110 or forming a channel in a bottom surface 114 of the connecting module. The term "cable receiving recess" 110 is used interchangeably with the term "channel". The cable receiving recess 110 is approximately one-half inch wide by one-eighth inch deep, and extends across the width of the connecting module 24, which may, for example, have a width of about 1.25 inches and a length of about 1.9 inches. However, any suitable dimension or shape may be used. The width of the channel 110 is about equal to the width of two cable carriers 16 arranged in an adjacent side-by-side configuration. The channel 110 is configured to removeably retain one or both cable carriers 16 and prevent movement of the cable carrier (s) relative to the connecting module 24.

The bottom surface 114 of the connecting module 24 includes two generally rectangular foot portions 120 disposed adjacent the cable receiving channel 110. Each foot portion 120 includes a protectively-backed adhesive material 122 to facilitate adhesively securing the connecting module 24 to an external surface when the connecting module is disposed over the cable carrier 16. The user peels off the protective backing and places the connecting module 24 over the cable carrier 16 so that the cable carrier is aligned with the channel 110.

Once the cable carrier 16 is releasably received within the channel 110, the connecting module 24 is firmly affixed against the wall 20 or other relatively flat surface so that the adhesive material 122 on the foot portions 120 secure the connecting module to the wall. If required, the connecting module 24 may be removed from the wall 20 by applying suitable hand pressure so that the adhesive bond is effectively broken. The connecting module 24 may than be relocated to a different position along the cable carrier 16 to facilitate connection to a relocated electronic component 14.

As best shown in FIGS. 3A and 3B, two fixedly mounted conducting metal prongs 104 are disposed proximal the channel 110, and are preferably offset from the center of the connecting module 24 along the channel. Each metal prong 10 has a sharp pointed end 130 that protrudes through the depth of the channel 110 and may, for example, extend about to the surface of the wall 20 to which the connecting module 24 is affixed. Each prong 104 is fixedly mounted in a spaced apart relationship in the channel 110. Preferably, the prongs 104 are embedded in a separate modular prong casing 132 and are integrally formed therewith. The modular prong casing 132 may, for example, be formed of plastic or other suitable material. The modular prong casing 132 is permanently affixed in a correspondingly shaped aperture 134 of the connecting module 24 by means of a suitable chemical adhesive. The modular prong casing 132 is in communication with the channel 110 so that the metal prongs 104 extend into the channel and contact the cable carrier 16. Alternately, the metal prongs 104 may be embedded in the material from which the connecting module 24 is formed, rather than in a separate modular piece.

Each prong 104 is configured to penetrate the cable carrier 16 and contact the braided wire 100 embedded within the bottom portion 62, or contact the braided wire that is fixedly retained against the internal portion 92 by the tabs 101 (FIG. 2A), to establish electrical continuity with the braided wire. The prongs 104 having sufficient height to penetrate the cable carrier 16 and contact the corresponding conducting elements 100 when the cable carrier is received within the channel 110. Because each prong 104 is disposed in a space apart orientation within the channel 110, and are equidistant from a center line 140 corresponding to each half of the channel, each prong contacts the corresponding conducting element 100 in the bottom portion 62 of the cable carrier 16.

Because the channel 110 may accommodate either one cable carrier 16 or two adjacent cable carriers, the channel has a width about equal to the width of two adjacent cable carriers positioned side-by-side. In most installations, one connecting module 24 is disposed over a single cable carrier 16. Thus, only one-half of the channel width is occupied by the cable carrier 16, and the corresponding prongs 104 are configured to contact the conducting elements 100 of that cable carrier. If the interconnection system is configured using two adjacent cable carriers 16, two connecting modules 24 are used, where the prongs 104 of one connecting module contact the conducting elements 100 of one cable carrier, and the prongs of the other connecting module contact the conducting elements corresponding to that cable carrier, as will be described in greater detail below.

Figure 4:
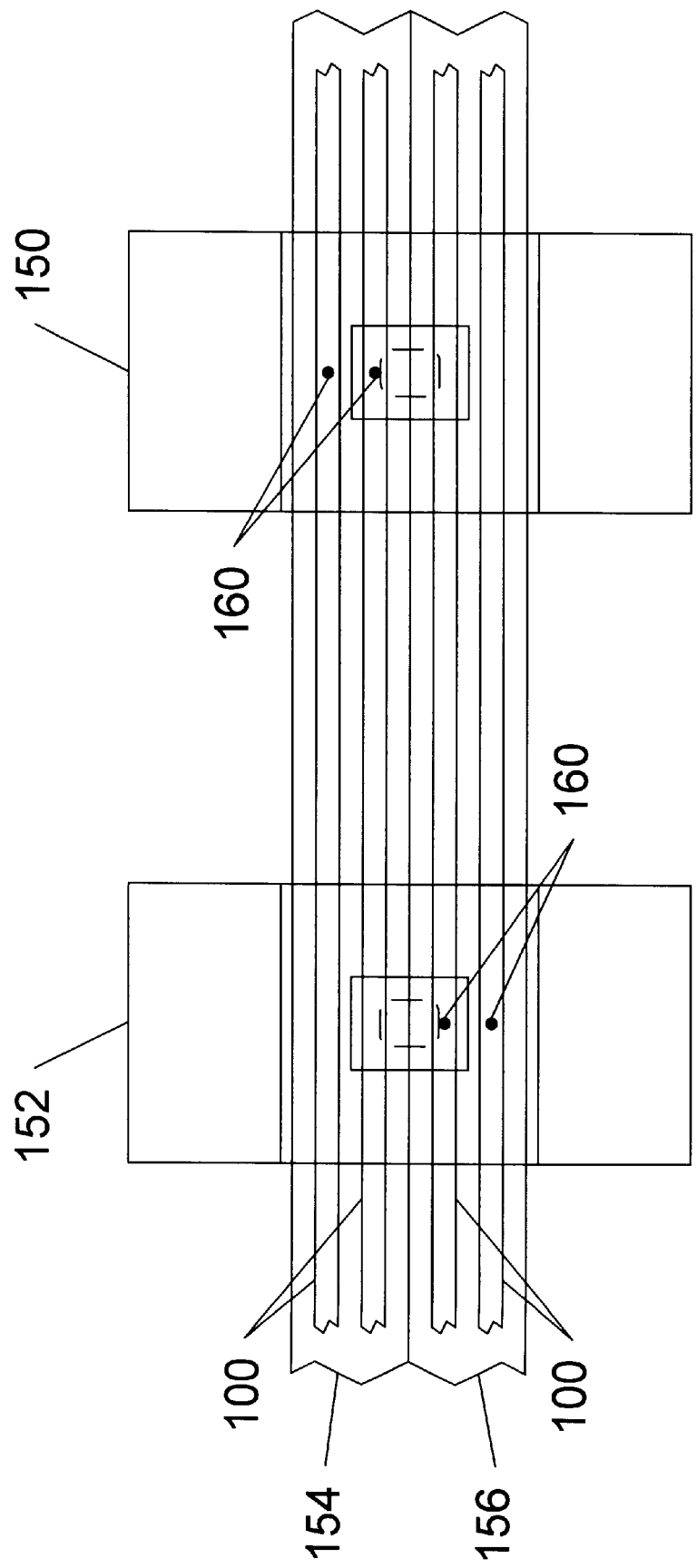
FIG. 4 is a side view of two adjacent cable carriers and two connecting modules disposed over two adjacent cable carriers.
Figure 5:
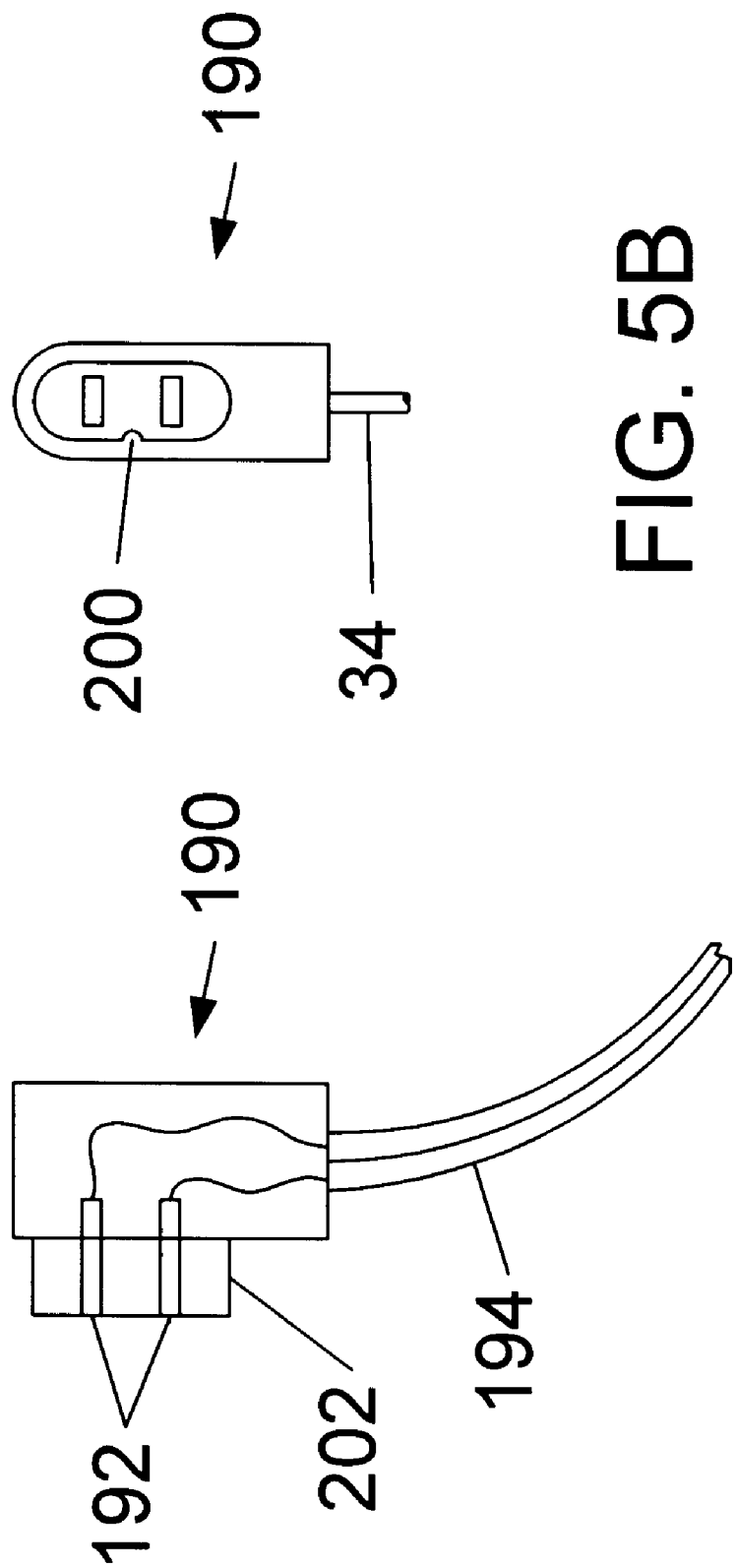
FIG. 5A is a side sectional view of a specific embodiment of a modular plug.
FIG. 5B is an end view of a specific embodiment of a modular plug.

Referring now to FIG. 4, the arrangement described above can be more easily seen. A first or right side connecting module 150 and a second or left side connecting module 152 are shown, each mounted over two adjacent cable carriers, referred to as an upper cable carrier 154 and a lower cable carrier 156. Each cable carrier 154 and 156 has two conducing elements (braided wire) 100 embedded therein. The right side connecting module 150 is shown with its corresponding prongs 104 (FIG. 3B) penetrating the conducing elements 100 of the upper cable carrier 154. The intersection of the prongs 104 and the conducting elements 100 is indicated by two small dots 160. The left side connecting module 152 is similarly shown relative to the lower cable carrier 156. Each connecting module 150 and 152 is identical to all other connecting module, thus the number of parts is kept to a minimum. In each connecting module 150 and 152, the prongs 104 are offset to one side so as to be in alignment with the conducting elements 100 of only one of the two cable carriers 16. To establish electrical continuity with the conducting elements 100 of the other cable carrier 16, one of the conducting modules 150 or 152 is turned by one-hundred and eighty degrees and mounted over the two cable carriers. Because the prongs 104 are offset, when the connecting module 26 is rotated by one-hundred and eighty degrees, the prongs make contact with the conducting elements 100 of the other cable carrier.

Referring now to FIGS. 3A–3C and 4, the channel 110 effectively maintains alignment between the metal prongs 104 and the corresponding braided wire 100 because the width of the channel is about equal to the width of two adjacent cable carriers 16. When only a single cable carrier 16 is used, the cable carrier "occupies" only one-half of the channel 110, as described above. In this situation, to maintain the cable carrier 16 in a fixed location on one selected half of the channel 110, a tab or thin breakable wall 168 (FIG. 3A) is provided that may be integrally formed with a peripheral edge 170 of the channel 110 and extends toward the bottom of the channel. Corresponding tabs 168 are located on opposite edges of the channel 110, essentially blocking one-half of the channel. Thus, the tabs 168, when present, prevent the cable carrier 16 from occupying one-half of the channel 110, and permit the remaining single cable carrier 16 to occupy the opposite one-half of the channel. Note that when only a single cable carrier 16 is involved, the cable carrier occupies the same half of the channel 110. Because the connecting module 150 or 152 may be "flipped" or rotated by one-hundred and eighty degrees, the second half of the channel appears to be occupied by the cable carrier 16. When two adjacent cable carriers 16 are used, the tabs 168 are broken away so that both halves of the channel 110 may be used to accommodate two adjacent cable carriers.

Regardless of whether one or two cable carriers 16 are used, when the connecting module 150 and 152 is placed over the cable carrier 16, the sharp pointed ends 130 of the prongs 104 penetrate the insulation of the body portion 60. After additional hand pressure is applied, each prong 104 penetrates the corresponding braided conductor 100 and established electrical continuity therewith. Preferably, the prongs 104 extend through the entire thickness of the cable carrier 16 to completely penetrate the braided conductors 100. Thus, once the connecting modules 150 and 152 have been placed over the cable carrier 16 and the cable carrier has been firmly retained within the channel 110, positive electrical continuity is established between the prongs 104 and the braided conductors 104 of the cable carrier. The connecting module remains firmly affixed to the wall via the adhesive foot portions 120.

As best shown in FIG. 3C, a side surface 180 of the connecting module 24 is shown. A plug receiving portion or aperture 182 is formed within the modular prong casing 132 of connecting module 24 in the form of an oval chamber. However, the chamber 182 may be of any suitable shape, such as square, rectangular, circular, and the like. Blunt ends of the prongs 104 extend from the modular prong casing 132 toward the top surface 180 of the connecting module 24 and provide electrical contacts by which to establish electrical continuity between corresponding braided conductors 100 and an external connection.

Referring now to FIGS. 3B–3C, and 5A–5B, FIGS. 5A–5B show a modular plug 190. The external connection between the conducting elements 100 of the cable carrier 16 and the prongs 104 is provided by the modular plug 190. The modular plug 190 includes two electrical contacts 192 that are connected to a wire 194, such as a curly telephone-type wire. The modular plug 190 fits into the aperture or plug receiving portion 182 in the prong casing 132 so that the blunt ends of the prongs 104 are received within the electrical contacts 192 of the modular plug 190. The electrical contacts 192 may, for example, be hollow round tube-like or rectangular connectors or clip-type connectors, or any other suitable contact mechanism configured to engage the blunt ends of the prongs 104. Thus, when the modular plug 190 is inserted into the aperture 182 of the connecting module 24, the curly wire 194 is electrically coupled to the conducting elements 100 of the corresponding cable carrier 16. The free end of the curly wire 194 is then corrected to the loud speaker 12 or electronic component 14. The modular plug 190 has a key or recess 200 disposed along an insertion portion 202 that is received within the connecting module 24 so that the modular plug can only be inserted in one direction.

Figure 6:
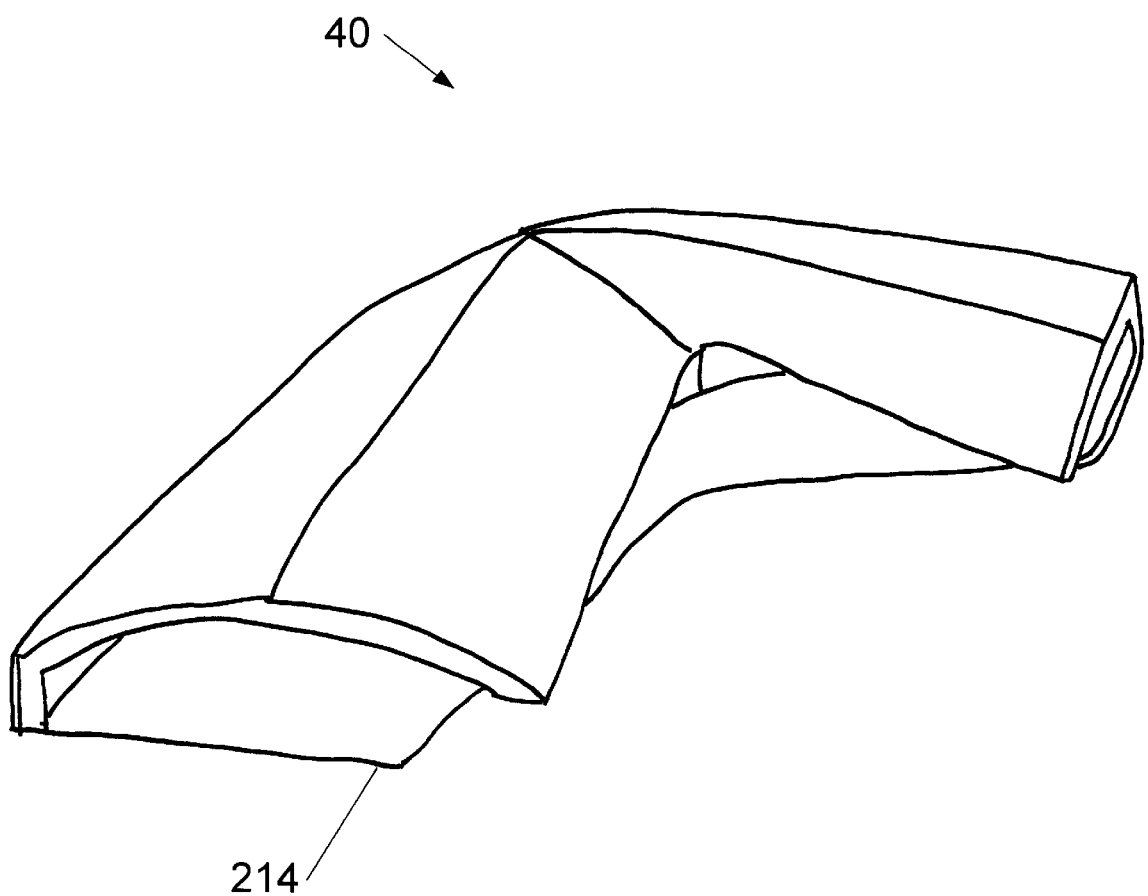
FIG. 6 is a perspective view of a specific embodiment of a planar corner guide, according to the present invention.

Referring now to FIGS. 1 and 6, FIG. 6 shows the planar corner guide 40. The planar corner guide 40 is preferably placed at the corners of a door to route the cable carrier 16 around the corners. The corner guide 40 essentially "hides" the bend in the cable carrier 16 that would ordinarily be visible at the point where the cable carrier bends. The corner guide 40 "clam-shell" type guide having an open inside edge to facilitate "wedging" or "sliding" the cable carrier 16 within the guide. A flat bottom portion 214 of the corner guide 40 includes a protectively-backed adhesive material so that the corner guide may be easily affixed to the wall proximal the corner of the door.

Figure 7A:
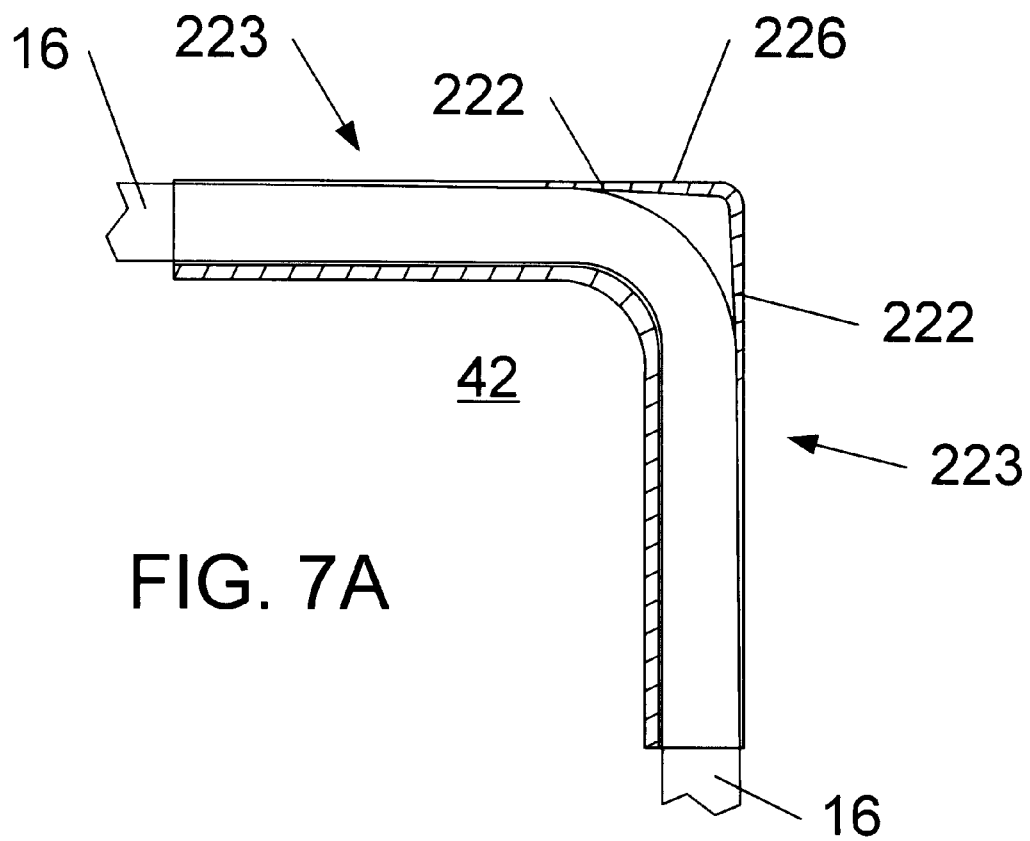
FIG. 7A is a top view of a specific embodiment of a hinge-type corner guide, according to the present invention.
Figure 7B:
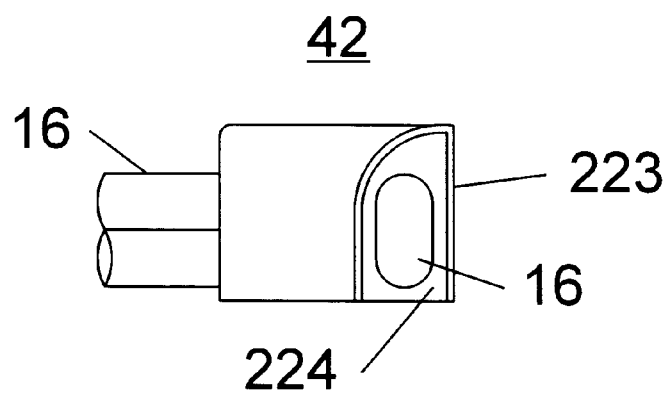
FIG. 7B is a side view of the hinge-type guide of FIG. 7A.

Referring now to FIGS. 1 and 7A–7B, FIGS. 7A–7B show the hinge-type corner guide 42. The hinge-type corner guide 42 is preferably placed at the intersection of two walls to route the cable carrier 16 around the inside corner of the wall. The hinge-type guide 42 includes a "U-shaped" body portion 222 that is bent at its midpoint at about ninety degrees. The body portion 222 includes an adhesive backing 220 so that the guide can be press-fit into the corner. The cable carrier 16 is essentially "wedged" into a "slot" 224 formed within the body portion 222. If two cable carriers 16 are used, a second hinge-type corner guide 42 may be used in a "flipped" orientation to route two cable carriers around inside corners.

Specific embodiments of a wiring interconnection assembly according to the present invention have been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

What is claimed is:

1. A wiring interconnection assembly for interconnecting a plurality of electrical components, the assembly comprising:

an insulated cable carrier comprising:
  a body portion formed of a flexible insulating material having at least one substantially flat surface portion, wherein the body portion further includes flexible side walls configured to provide structural rigidity, the body portion configured to be releasably retained within a channel having channel side walls such that the flexible side walls abut the channel side walls;
  an adhesive material affixed the at least one surface portion to facilitate adhesively securing the cable carrier to an external surface;
  a removable protective backing affixed to the adhesive material;
  at least one conducting element integrally formed with and embedded within the body portion;
  the at least one conducting element formed of a braided wire;
  the braided wire configured to partially resist separation of strands caused by penetration through the braided wire by a penetrating member configured to pierce the body portion and contact the braided wire; and
  the resistance to separation of the strands of the braided wire forming an interference fit with the penetrating member so as to establish and maintain electrical continuity between the braided wire and the penetrating member;
a connecting module removably coupled to the cable carrier configured to facilitate connection of each end of the cable carrier to one of the plurality of electrical components; and
the connecting module having at least one penetrating member configured to penetrate a portion of the body portion of the cable carrier and contact the at least one conducting element to establish electrical continuity therewith.

2. The assembly according to claim 1 wherein the cable carrier is disposed between two electrical components and each electrical component is operatively coupled to the connecting module by a length of coiled wire.

3. The assembly according to claim 1 wherein the cable carrier is disposed between two electrical components and each electrical component is operatively coupled to the connecting module by a relatively short length of wire.

4. The assembly according to claim 1 wherein the connecting module includes a cable receiving recess forming a channel within a surface portion of the connecting module, the channel configured to releasably retain at least one cable carrier and maintain alignment between the at least one penetrating member and the at least one conducting element.

5. The assembly according to claim 4 wherein the channel includes an inside surface portion and side portions, configured to align the at least one cable carrier relative to the channel.

6. The assembly according to claim 4 wherein the channel includes a tab portion extending toward a center of the channel configured to abut a single cable carrier disposed in the channel such that the single cable carrier is retained in a fixed orientation relative to the channel.

7. The assembly according to claim 1 wherein the cable carrier includes two electrical conducting wire elements, and the connecting module includes two penetrating members configured to pierce a portion of the body portion and contact the corresponding conducting elements to establish electrical continuity therewith.

8. The assembly according to claim 7 wherein the connecting module includes a cable receiving recess forming a channel within a surface portion of the connecting module configured to releasably retain the cable carrier and maintain alignment between each penetrating member and the corresponding conducting element.

9. A wiring interconnection assembly for interconnecting a plurality of electrical components, the assembly comprising:
  an insulated cable carrier comprising:
    a body portion formed of a flexible insulating material having at least one substantially flat surface portion, wherein the body portion further includes flexible side walls configured to provide structural rigidity, the body portion configured to be releasably retained within a channel having channel side walls such that the flexible side walls abut the channel side walls;
    an adhesive material affixed the at least one surface portion to facilitate adhesively securing the cable carrier to an external surface;
    a removable protective backing affixed to the adhesive material;
    at least one conducting element integrally formed with and embedded within the body portion;
    the at least one conducting element formed of a braided wire;
    the braided wire configured to partially resist separation of strands caused by penetration through the braided wire by a penetrating member configured to pierce the body portion and contact the braided wire; and
    the resistance to separation of the strands of the braided wire forming an interference fit with the penetrating member so as to establish and maintain electrical continuity between the braided wire and the penetrating member;
  a connecting module removably coupled to the cable carrier configured to facilitate connection of each end of the cable carrier to one of the plurality of electrical components;
  the connecting module having a channel formed in a surface portion thereof to define a cable retaining recess;
  the connecting module having at least one fixedly mounted conducting prong configured to penetrate a portion of the body portion and contact the at least one conducting wire element to establish electrical continuity therewith when the cable carrier is removably retained within the cable retaining portion; and
  the connecting module configured to maintain alignment between the at least one conducting prong and the corresponding at least one conducting wire element.

10. The wiring interconnection assembly according to claim 9 further including protectively-backed adhesive material disposed on a bottom portion of the connecting module adjacent the cable receiving recess to facilitate adhesively securing the connecting module to an external surface when the connecting module is disposed over the cable carrier.

11. The wiring interconnection assembly according to claim 9 further including at least two electrically conducting prongs fixedly mounted in a spaced apart relationship in the cable receiving recess, the prongs having sufficient height to penetrate the cable carrier and contact corresponding conducting elements when the cable carrier is received within the cable receiving recess.

12. The wiring interconnection assembly according to claim 11 wherein the two prongs are disposed in the cable receiving recess such that each prong is aligned with the corresponding at least one conducting element in the cable carrier when the cable carrier is received within the cable receiving recess.

13. The wiring interconnection assembly according to claim 9 including a plug receiving portion in communication with the at least one prong, the plug receiving portion configured to receive an electrical plug so as to establish electrical continuity between electrical contact elements of the electrical plug and the corresponding conducting elements of the cable carrier, said electrical continuity established through the corresponding prongs.

14. The wiring interconnection assembly according to claim 9 wherein the connecting module is formed of a molded plastic material and includes at least one conducting prong disposed is a central portion of the conducting module.

15. A wiring interconnection assembly for interconnecting a plurality of electrical components, the assembly comprising;

an insulated cable carrier comprising:
 a body portion formed of a flexible insulating material having at least one substantially flat surface portion, wherein the body portion further includes flexible side walls configured to provide structural rigidity, the body portion configured to be releasably retained within a channel having channel side walls such that the flexible side walls abut the channel side walls;
 an adhesive material affixed the at least one surface portion to facilitate adhesively securing the cable carrier to an external surface;
 a removable protective backing affixed to the adhesive material;
 at least one conducting element integrally formed with and embedded within the body portion;
 the at least one conducting element formed of a braided wire;
 the braided wire configured to partially resist separation of strands caused by penetration through the braided wire by a penetrating member configured to pierce the body portion and contact eh braided wire; and
 the resistance to separation of the strands of the braided wire forming an interference fit with the penetrating member so as to establish and maintain electrical continuity between the braided wire and the penetrating member;

connecting means removably coupled to the cable carrier configured to facilitate connection of each end of the cable carrier to one of the plurality of electrical components; and penetrating means formed with the connecting means configured to contact the at least one conducting wire element to establish electrical continuity therewith.

16. An insulated cable carrier comprising:
 a body portion formed of a flexible insulating material having at least one substantially flat surface portion, wherein the body portion further includes flexible side walls configured to provide structural rigidity, the body portion configured to be releasably retained within a channel having channel side walls such that the flexible side walls abut the channel side walls;
 an adhesive material affixed the at least one surface portion to facilitate adhesively securing the cable carrier to an external surface;
 a removable protective backing affixed to the adhesive material;
 at least one conducting element integrally formed with and embedded within the body portion;
 the at least one conducting element formed of a braided wire;
 the braided wire configured to partially resist separation of strands caused by penetration through the braided wire by a penetrating member configured to pierce the body portion and contact the braided wire; and
 the resistance to separation of the strands of the braided wire forming an interference fit with the penetrating member so as to establish and maintain electrical continuity between the braided wire and the penetrating member.

17. The cable carrier of claim 16 wherein the body portion is extruded and includes two conducting braided wire elements disposed within the body portion in a spaced relationship.

* * * * *